(12) United States Patent
Khadiya (10) Patent No.: US 12,344,087 B2
(45) Date of Patent: Jul. 1, 2025

(54) SYSTEM AND METHODS FOR MODULAR VEHICLE ENERGY REPLENISHMENT

(71) Applicant: Deere & Company, Moline, IL (US)

(72) Inventor: Navin Khadiya, Cedar Falls, IA (US)

(73) Assignee: Deere & Company, Moline, IL (US)

(*) Notice: Subject to any disclaimer, the term of this patent is extended or adjusted under 35 U.S.C. 154(b) by 125 days.

(21) Appl. No.: 18/179,566

(22) Filed: Mar. 7, 2023

(65) Prior Publication Data
US 2024/0300321 A1   Sep. 12, 2024

(51) Int. Cl.
*B60K 15/03* (2006.01)
(52) U.S. Cl.
CPC .......... *B60K 15/03006* (2013.01); *B60K 2015/03184* (2013.01)
(58) Field of Classification Search
CPC ............... B60K 15/03006; B60K 2015/03184
See application file for complete search history.

(56) References Cited

U.S. PATENT DOCUMENTS

2014/0308553 A1   10/2014   Kim
2018/0072152 A1*   3/2018   Dudar .................. B67D 7/0492

* cited by examiner

*Primary Examiner* — Lindsay M Low
*Assistant Examiner* — Charles J Brauch
(74) *Attorney, Agent, or Firm* — Tucker Ellis LLP; Michael G. Craig (57) ABSTRACT

One or more techniques and/or systems are disclosed for automatically refueling a vehicle using fuel storage modules. The vehicle can comprise a vehicle-side fuel module storage that is coupled with a fuel manifold to provide fuel to the vehicle. A remote fuel storage can be located proximate the target operation for the vehicle. When a fuel loading event is identified, such as low fuel, the vehicle can transit to the remote fuel module storage. Once appropriately aligned, actuators can be used to automatically exchange fuel modules between the vehicle-side fuel module storage and the remote fuel module storage.

19 Claims, 5 Drawing Sheets

SYSTEM AND METHODS FOR MODULAR VEHICLE ENERGY REPLENISHMENT

BACKGROUND

In an agricultural or construction setting, vehicles typically utilize easy to store, high energy dense fuels, such as gasoline or diesel. However, these fuels are also indicated for undesired pollutants. Storage of lower energy dense fuels, such as electricity, propane, natural gas, etc., takes up greater space relative to weight, and typically do not provide enough range for agricultural and construction vehicle, compared to gasoline and diesel. As such, the use of the lower energy dense fuel may require frequent stops and refueling, which leads to lower efficiency, and lowered production.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. that can operably couple wit One or more techniques and systems are described herein for automatically reloading fuel into a vehicle that is performing a target operation, such as a agricultural or construction operation. The vehicle can utilize a plurality of fuel modules that each store and provide fuel to the vehicle. A remote fuel module storage can be located proximate the target operation, such that the vehicle can exchange fuel modules as needed, such as when fuel is low on the vehicle, the vehicle is near the remote storage and idle, or the target operation is predicted to need a certain amount of fuel before the vehicle is near the remote storage. A controller can identify an appropriate time for the fuel loading event, and the vehicle can align its onboard modules with the remote fuel station. Actuators can automatically exchange a full module(s) with an empty module(s), and the vehicle can proceed with the target operation. In this way, efficient fueling may be performed, particularly when the type of fuel used has a lower energy density than fuels such as gasoline and diesel.

In one implementation of a system for automatically refueling a vehicle using fuel storage modules, a vehicle can comprise a fuel manifold that couples with a plurality of fuel modules and controls fuel flow from the fuel modules to provide fuel to the vehicle. Here, the respective fuel modules store fuel for the vehicle. Further, in this implementation, a remote fuel storage apparatus is disposed proximate to a target operation performed by the vehicle. The remote fuel storage apparatus comprises a plurality of storage bays that respectively hold a fuel module, and at least one empty bay to receive a fuel module from the vehicle. Additionally, one or more actuators move fuel modules between storage bays in the remote fuel storage module, and also move modules between the vehicle and the remote fuel storage apparatus. In this implementation, a controller comprises memory configured to store instructions and data, and a processor to process the data and instructions. The controller identifies a fuel loading operation that comprises transiting the vehicle to the remote fuel storage apparatus to exchange modules between the vehicle and the remote fuel storage apparatus.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As described herein, one or more systems and methods can be devised that provides for fast, modular fueling replenishment, such as in the field during an agricultural operation. As an example, diesel or gasoline engine use is targeted for replacement with lower carbon emitting options, such as hydrogen, ethanol, biomethane/natural gas, low/no carbon fuels (e.g., ethanol, methanol, ammonia) and battery/electric fuels. These lower carbon emission fuels typically have a lower energy density than diesel or gasoline. As such, vehicles using these fuels may need to have the fuel replenished more often, due to size/weight restrictions for vehicle designs, particularly if the same dimensions for fuel storage are maintained in alternate fuel vehicles. With lower energy dense fuels, the total hours of productive work possible with a single tank/charge may not be sufficient to perform task in a high energy consumption operation, such as agriculture and construction. This means that more frequent re-fueling/charging may be needed, and that the re-fueling must be quick and easy. This is especially true for a fully autonomous vehicle, otherwise refueling may require an operator to be present when the vehicle is low on fuel during the work operations. To that end, the one or more systems and methods described herein can provide for easy, efficient modular fuel replenishment, even in the field during operations. Such systems can mitigate potential down time for vehicle operations, and may take advantage of potential fueling windows to improve work efficiencies.

That is, for example, a modular fueling station can be positioned proximate the work operation, where target vehicles may be used. In this example, the vehicle can use fuel modules (e.g., storing a lower energy dense fuel) that are on-board the vehicle to fuel the engine. Similar modules can be stored in a module storage station that provides for quick and efficient exchange of fuel modules with those on-board the vehicle. In this example, the modular fueling station can be configured to automatically align a full fuel module with an appropriate fuel module location (e.g., empty slot) on the vehicle; and, when aligned, load the full module into the target location on the vehicle. Further, an empty fuel module on the vehicle can be aligned with an automatically selected empty location in the fueling station, and the empty fuel module can be transferred to the fueling station. In this way, the vehicle can be automatically refueled in a quick and efficient manner, as needed. Additionally, the modular fueling system can be readily used with an autonomous vehicle system, as operator intervention is reduced by the automated selection and transfer of the full and empty canisters to and from the vehicle.

In one aspect of the innovation described herein, instead of a large single tank of fuel or battery, smaller fuel modules can be utilized to store and provide fuels. The modules (e.g., bottles, cartridges, tanks, etc., containing fuel or batteries) can be standardized across the target vehicles (e.g., and potentially across the target vehicle industry). As one example in this aspect, the storage of fuel in the field could be similar to the vehicle storage arrangement. That is, the field storage may have a grid pattern arrangement for storage, as would the vehicle, but an overall size could be larger than vehicle energy storage to accommodate multiple vehicles, or to increase storage. As an example, the vehicle may transit to the fuel storage when the vehicle is running low on fuel for a desired operation, or if there's an opportunity to "refill" due to proximity to the storage during the operation. As another example, the vehicle may transit to storage when it's not predicted to be performing productive work, such as when idle. In these examples, the vehicle could transit to the storage location, park proximate the storage in such a manner that allows for an automated or manual exchange of one or more modules.

Figure 1:
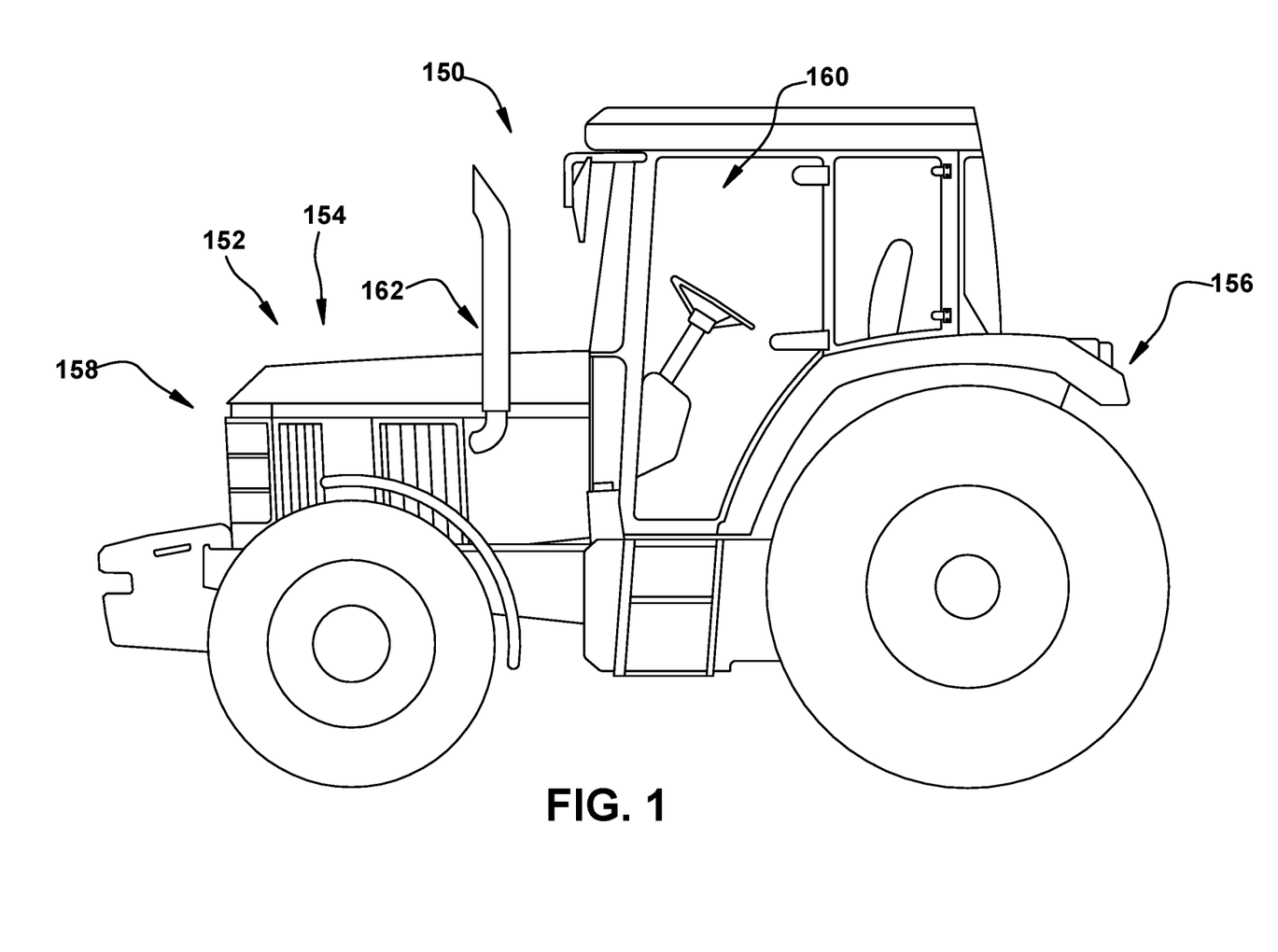
FIG. 1 is a component diagram illustrating one implementation of an example vehicle that may implement one or more systems and methods described herein.

As an illustrative example, FIG. 1 illustrates a component diagram of an example vehicle that may utilize the techniques and system described herein. As illustrated in FIG. 1, an agricultural or construction vehicle 150 (e.g., but could also be a truck, car, or other vehicle), such as a tractor, hauler, or the like, can be powered by an engine 154. The vehicle has a front 158 and a rear 156, and can comprise an operator compartment 160, such as a cab or the like. In this example, the engine 154 is disposed in an engine compartment 152 at the front 158 of the vehicle (e.g., although engines can be disposed mid-vehicle, or at the rear of the vehicle). The engine compartment 152 typically houses the engine 154 and other powertrain components, including a fueling system 162, which can comprise the modular fueling system described herein. Typically, a vehicle has a fuel tank that is a reservoir for holding fuel. In this example, as described herein, the engine fueling system comprises one or more fuel reservoirs, tanks, or more generally, modules that hold fuel used by the fueling system, such as to power the engine, or other components, for operation, and can be readily switched out. Essentially, the fuel module is a tank or container that holds fuel to be used by the vehicle to power operations, and can be switched out to provide more fuel.

Figure 2A:
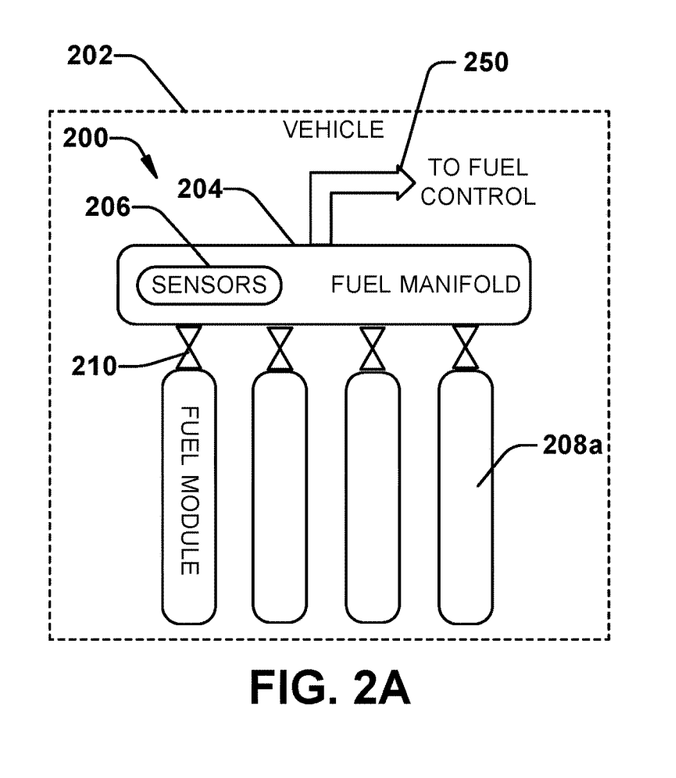
FIGS. 2A and 2B are component diagrams illustrating one or more portions of one or more systems and methods described herein.
Figure 2B:
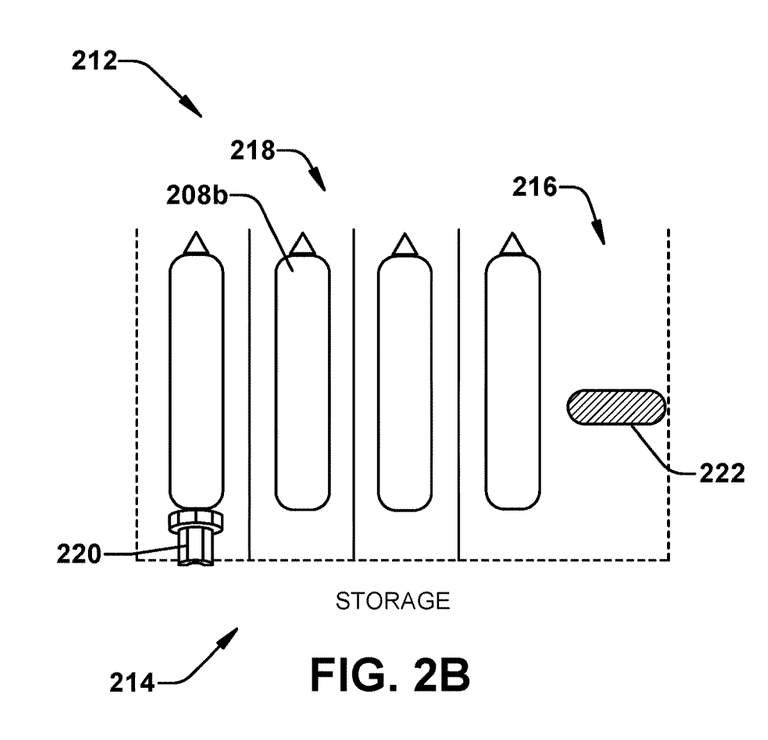

FIGS. 2A and 2B are schematic diagrams illustrating one example of one or more portions of a system for modular fueling of a vehicle 202. In this example, the vehicle 202 can comprise a fueling system 200 (e.g., 162 of FIG. 1) that provides fuel to a fuel control 250 for the vehicle, that effectively distributes fuel to operate an engine, etc. Further, the fueling system 200 can comprise a fuel manifold that operably couples with one or more fuel modules 208. As described herein a fuel module 208 can comprise a container, or the like, that stores fuel, and operably releases the fuel during operation of the vehicle 202. For example, the fuel can comprise any suitable energy store that can be used by the vehicle 202 for performing work, such as electricity, hydrocarbon-based fuels (e.g., propane, natural gas, butane, etc.), hydrogen, low/no carbon fuels (ethanol, methanol, ammonia, etc.), and other lower energy-dense fuels (e.g., lower energy density than gasoline or diesel). The fuel manifold 204, for example, can be used to control the flow of the fuel from respective one or more fuel modules 208.

In this example, one or more sensors 206 (e.g., a sensor array) can comprise sensing devices used to detect applicable data related to performance of the fueling system 200. For example, such data can comprise fuel pressure, fuel flow, fuel amount, fuel leakage, proper connection at a fuel module coupling 210 (e.g., connection point) between the fuel manifold 204 and the module(s) 208, etc. As an example, the sensors 206 can comprise a sensor that detects whether the fuel module 208 is appropriately coupled with the fuel module coupling 210. In some implementations the sensors can comprise an alignment sensor, such as an image sensor (e.g., or other object detection device, such as sonar, radar, and more) that may be used to detect alignment between the module 208 and fuel manifold at the connection point 210.

As an example, the vehicle may utilize the fuel from a fuel module 208 at least until the fuel level in the module reaches a pre-determined threshold level. For example, a sensor 206 can detect a level of fuel in the module (e.g., stored electrical power, liquid or gas fuel), such as by using a volt detector (e.g., or other electrical detector), pressure sensor, fluid level sensor, flow rate sensor, etc. Further, the pre-determined fuel threshold level may be established that is indicative of a desired, target performance, that provides for or triggers a desired result. For example, an "empty" (e.g., or near empty) threshold level may trigger the manifold 204 to switch to another (e.g., full) fuel module 208. Additionally, for example, the pre-determined threshold may be automatically adjusted based at least on a distance (e.g., and projected time of travel, including energy needed for travel) to a fueling station. In this example, a notification can be provided (e.g., or action triggered) that allows the operator of the vehicle (e.g., or on-board computer) to identify the action of returning to a fueling station. As another example, other actions may include monitoring and adjusting the threshold based on a target operation, which would be indicative of how much fuel is needed to perform the operation before refueling may be needed. It is anticipated that other potential actions and desired results can be used to determine the threshold, such as target projects needing a particular amount of fuel, and the amount of fuel present in the vehicle and storage site; a proximity to the fueling station, etc.

In the examples illustrated in FIGS. 2A and 2B, a fuel storage unit 212 (e.g., fueling station, fueling unit, etc.) comprises a plurality of bays 214 that are configured to hold fuel modules 208. The bays 214 may consist of occupied bays 218 and unoccupied bays 216. That is, an occupied bay can hold an empty (e.g., below the predetermined threshold level) or full (e.g., above the predetermined threshold level) fuel module 208, and the unoccupied bay(s) 216 are presently empty, or not holding modules 208. Further, one or more of the respective bays 214 can comprise a module expulsion device 220 that is configured to remove a module 208 from the bay 214. As an example, the module expulsion device 220 can comprise a plunger, piston, grappler, arm, movable stop, or some similar mechanical system that pushes or pulls the module 208 from the occupied bay 218. Additionally, one or more of the respective bays 214 can comprise module placement device 222 that is configured to draw the module 208 into the empty bay 216. For example, the module placement device 222 can comprise a grappler, arm, clamp, or some similar device that grabs the module 208 and draws it into the empty bay 216.

In this way, for example, an empty fuel module 208a can be drawn from connection 210 with the fuel manifold 204 into an empty bay 216, using the module placement device 222. Further, in this example, a full module 208b may be expelled from (e.g., pushed, pulled) an occupied bay 218 using the module expulsion device 220, and placed into an empty position at the fuel manifold 204. In some implementations, the module placement device 222 may also be used expel modules, in lieu of the module expulsion device 220.

As one illustrative example, with continued reference to FIGS. 2A and 2B, FIGS. 3A and 3B are schematic component diagrams illustrating one example implementation of portions of the modular fueling system described herein. In this example, a vehicle-side modular fuel station 300 can be complementary to a storage-side modular fuel station 302. That is, for example, the storage-side modular fuel station 302, such as disposed in the field, could be essentially a similar design as the vehicle-side modular fuel station 300, disposed on/in a vehicle (e.g., or one that at least aligns the two together). In some implementations, the storage-side modular fuel station 302 can have a same or similar grid pattern as the vehicle-side modular fuel station 300, but the overall size of the storage-side modular fuel station 302 may be the same or larger than vehicle-side modular fuel station 300.

Figure 3A:
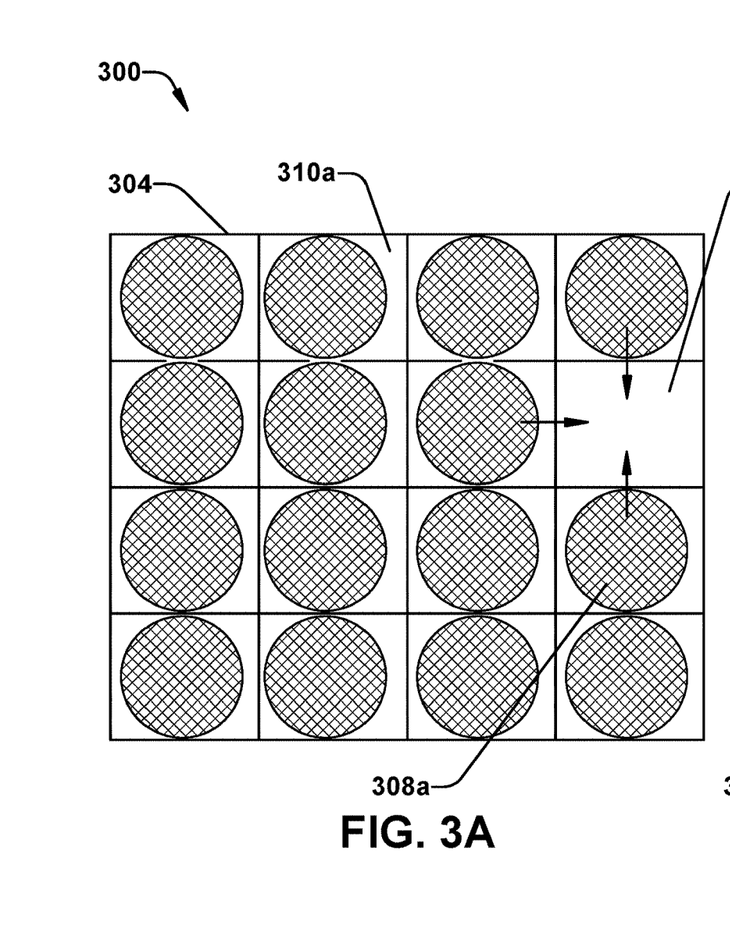
FIGS. 3A and 3B are component diagrams illustrating one or more portions of one or more systems and methods described herein.
Figure 3B:
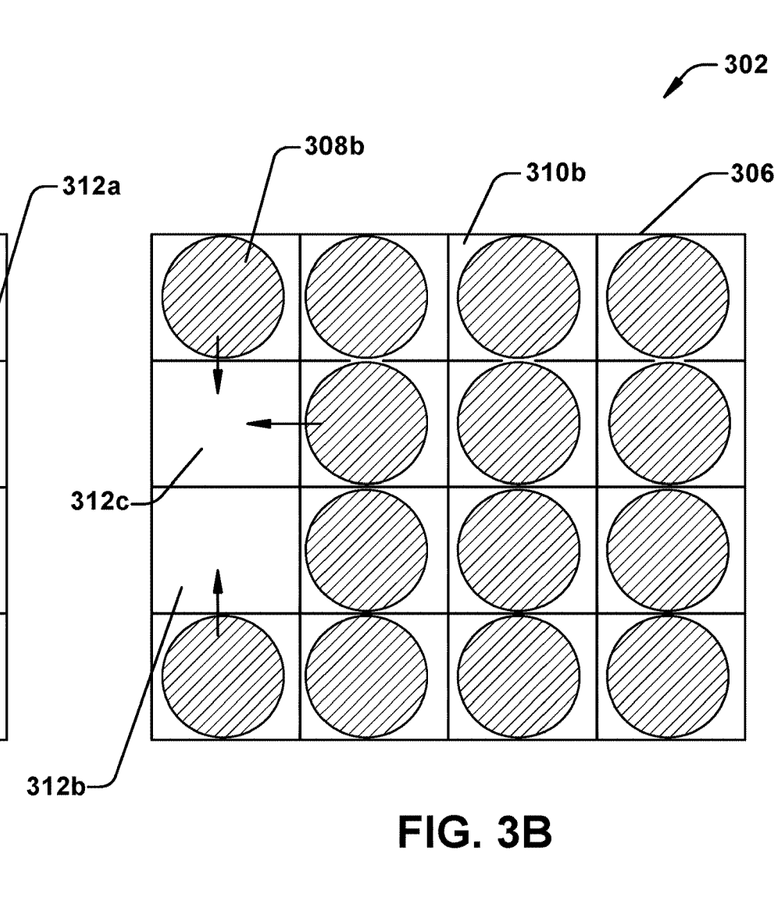

As illustrated, in this example, the vehicle-side modular fuel station 300 can be disposed on the target vehicle, in a position that is accessible for module 308 exchange. Further, in operation, one or more empty bays 312a (e.g., or slot, position, etc.) can be disposed in the framework 304 that is used to store the respective modules 308, along with occupied (e.g., or full) bays 310a that hold a module 308. Additionally, a module can be moved around the framework 304 according to a scheduled replacement event. That is, for example, an empty module 308a can be moved into an empty bay 312a, for later removal and replacement.

The storage-side modular fuel station 302 can be situated proximate the location of a target operation of the vehicle, such as at the side of a field or construction site, for example. Further, in operation, one or more empty bays 312b, 312c can be disposed in the framework 306 that is used to store the respective modules 308, along with occupied (e.g., or full) bays 310b that hold a module 308. Additionally, a module can be moved around the framework 304 according to a scheduled replacement event. That is, for example, a full module 308b can be moved into an empty bay 312b, 312c, for replacing an empty module 308a in the vehicle-side modular fuel station 300.

As one example, an automatic fuel module exchange may occur as follows. A determination is made that the target vehicle comprising the vehicle-side modular fuel station 300 can add fuel (e.g., a fuel loading operation). For example, a fuel loading operation may be triggered when the vehicle may be running low on fuel for the target operation (e.g., operation may not be completed with the amount of fuel onboard the vehicle at that time); or the vehicle may be proximate the storage-side modular fuel station 302 during the target operation, therefore it is determined that it is efficient/economical to refuel; an/or the vehicle may be currently idle (e.g., not performing productive work), providing an opportunity to fuel up during a down time.

In this example, upon determining that the vehicle has been targeted for fueling (e.g., identifying the fuel loading operation), the vehicle can park itself (e.g., autonomously or using an operator) in a manner that aligns appropriately the vehicle-side modular fuel station 300 with the storage-side modular fuel station 302, such that a module 308 exchange can take place. Further, upon determination that the vehicle-side modular fuel station 300 is appropriately aligned with the storage-side modular fuel station 302, an automated mechanical device on the storage side can align an empty cell 312c, 312b to the cell that has the empty module 308a targeted for replacement.

That is, for example, one or more arms, levers, gears, gantries, or other mechanical means can be used to shift modules 308 in the storage-side modular fuel station 302 to provide an empty bay 312 in the storage side 302 that aligns with the empty module 308a on the vehicle side 300. As an example, a database can store information related to respective fuel modules, and bays in the storage frameworks 304, 306, including position (e.g., in storage or vehicle), fuel level, condition (e.g., occupied, empty), etc., and the database can be used to identify the location and condition of the respective modules 308 in the storage frameworks 304, 306. Alternately, one or more sensors may be used to identify a position (e.g., in the storage frameworks 304, 306) and condition (e.g., fuel level) of respective modules. In this way, the database or sensor information may be used to move a target module 308 to a target location based on the situation, such as moving a module out of a bay to accommodate another module, or moving a full module to a location in an empty bay for fueling.

In this example, one or more checks can be performed to determine that appropriate fueling conditions are present (e.g., appropriate fuel line pressure, locations of modules, condition of modules, leak detection, alignment procedures, etc.). After performing the condition checks, the vehicle side (e.g., or the storage side) can comprise a mechanism that draws (e.g., pulls or pushes) the empty module 308a into the storage side empty bay/cell 312b. Additionally, the storage side 302 can move a full module 308b into a bay 312c that aligns with an empty cell 312a on the vehicle side 300. Again, one or more checks can be performed to determine that appropriate fueling conditions are present (e.g., appropriate fuel line pressure, locations of modules, condition of modules, leak detection, alignment procedures, etc.). After performing the condition checks, the storage side (e.g., or the vehicle side) can comprise a mechanism that draws (e.g., pulls or pushes) the full module 308b into the vehicle side empty bay/cell 312a.

In some implementations, the operator of the target vehicle can utilize a dashboard display that provides information comprising the status of of the fueling system, including fuel level of respective modules, position of various modules and empty bays, condition of storage side-condition of modules 308, position, etc. This may allow the operator to determine when/if to fuel, plans for fueling, and how to proceed. In some implementations, where an autonomous (e.g., fully or partially) vehicle may be utilized, the vehicle can automatically determine when to refill/ replenish based on the criteria described above, including, when the vehicle is running low on fuel, or when there's an opportunity to "refill" due to proximity to storage, or when not doing productive work.

Figure 4:
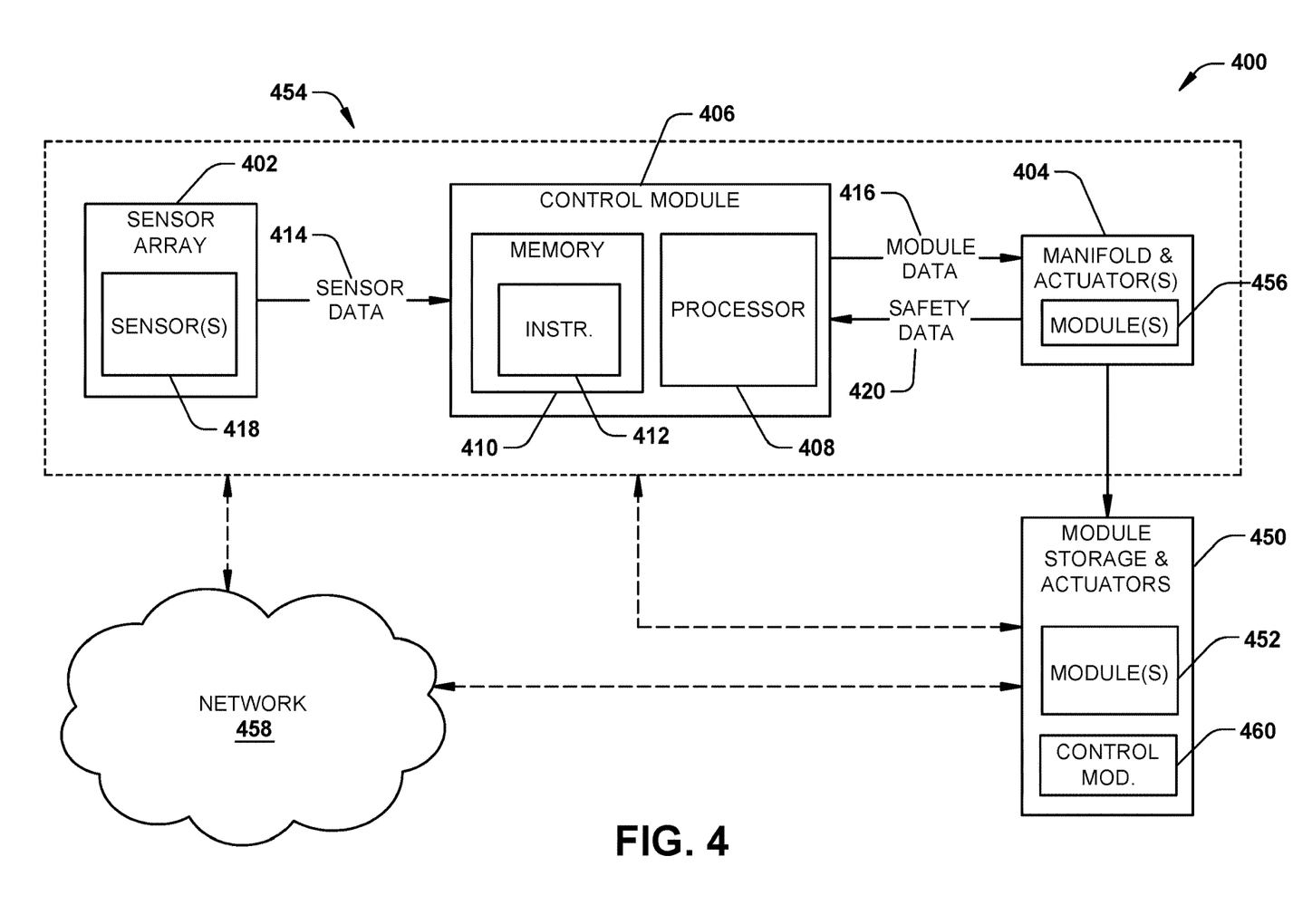
FIG. 4 is a schematic diagram that illustrates one or more portions of one or more systems and methods described herein.

FIG. 4 is a schematic diagram of one or more portions of one or more systems described herein. Specifically, a fueling system 400 can be configured to identify when a target vehicle 454 may be ready to refuel using on-board, fuel storage modules 456. In this implementation 400, the vehicle 454 can be in communication with a network 458 (e.g., local and/or remote), and a stand-alone fuel storage site 450 may also be in communication with the network 458. In some implementations, the vehicle may have a direct communication coupling with the storage site. In this way, information regarding the fuel status of the vehicle 454 and of the site storage 450 can be remotely identified, and data associated with this information may be used to determine if and when to refuel the vehicle 454.

On-board sensors 418 in a sensor array 402 can be used to identify a fuel status of the vehicle, such as amount on-board, amount used, use rate, projected use rate, etc. Sensor data 414 can be provided to a control module 406 (e.g., control unit, or central processing unit, etc.), which can be used to identify when and if the vehicle refuels, based on sensor data 414, and programmed or identified parameters. For example, a target operation (e.g., harvesting a particular crop in a particular field, during particular environmental conditions) can be input to the control module 406, along with locations and amounts of fuel at the storage site 450 (e.g., this can be input or identified from the network 458). Based on this information/data, instructions 412 stored in memory 410 in the control module 406 can be processed by a processor 408 with the data to identify when and if the vehicle should traverse to the storage site 450 to refuel (e.g., switch modules 456, 452—empty for full).

Further, in this example, when the vehicle moves to the storage site 450 (as described above), module data 416, comprising fuel amounts, locations of modules 456, locations of empty bays, etc., can be sent to the vehicle side modular fueling station 404 coupled with the fuel manifold, with actuators, to begin the process of refueling. In this example, an empty module 456 can be identified and the vehicle 454 can align with an empty bay at the storage site 450. A storage control module 460 can be configured to determine a location of the at least one empty bay for receiving a fuel module 456 from the vehicle 454, and can determine a location of a storage bay with a non-empty fuel module for transfer to the vehicle 454. An actuator at the vehicle side modular fueling station 404 can be used to disconnect the module 456 from the manifold vehicle side modular fueling station 404, and transfer the module 456 to the storage site 450 empty bay. Safety data can be identified for the fueling manifold and vehicle side modular fueling station 404, as described above, and transferred to the control module 406. This data 420 may be used to determine when and if it is appropriate to exchange the modules, for example, to identify that systems are within operational parameters to meet the needs of the fueling exchange.

Further, the site storage—module storage with actuators 450—can align a full module 452 an appropriate and empty bay at the fuel manifold 404 in the vehicle 454, such as using the storage control module 460. An actuator in the module storage 450 can be used to transfer the full module 452 to a selected fuel location on the manifold 404, and the exchange can be made upon a signal from the control module 406, noting that the safety data 420 indicates operational parameters are met. In this way, for example, the vehicle 454 can continue the target operation as needed, and fuel up at site storage 450 when appropriate and/or needed.

Figure 5:
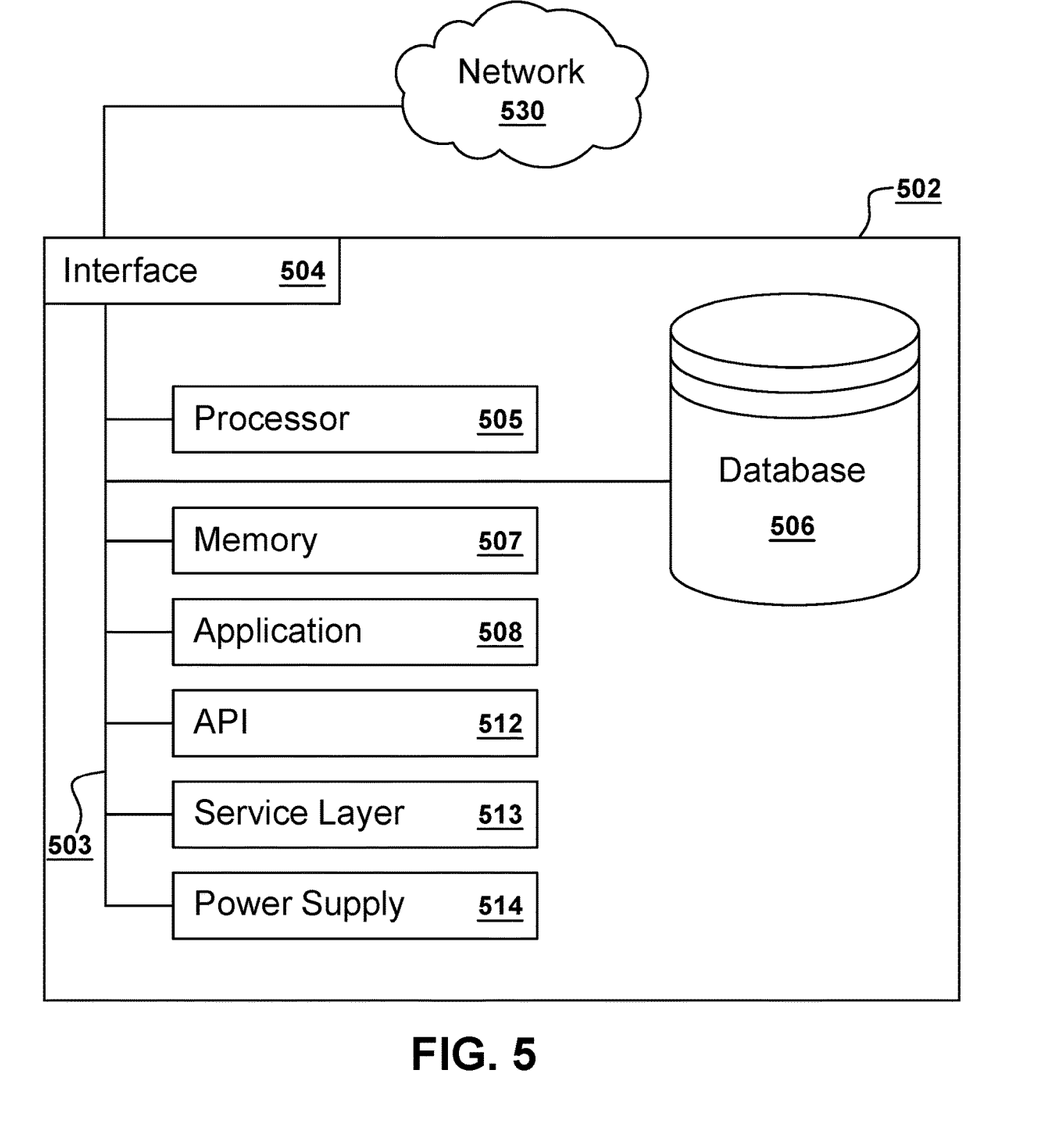
FIG. 5 is a schematic diagram of an example computer system that can be used to provide computational functionalities associated with methods and systems described herein.

FIG. 5 is a schematic diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user—or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

Additionally, in some implementations, the data can be collected at regular intervals (e.g., or continually) and curated into a remote operations center, and loaded to a database with spatial and temporal indexing capabilities. As one example, the data may be analyzed as it is collected for unload begin and end signals, and then, in combination with the location and time information, and the data records, determine which product transport container (e.g., grain cart or trailer) was positioned at a location at that time given known equipment dimensions and characteristics. In this example, once a match is identified, a "Virtual Load" record may be created or extended for the equipment receiving the load that contains pre-determined load metrics and characteristics, such as weight, volume, load time, condition of the product, and much more. As an example, this collection and curation of the data can be done automatically based on the load signals, location, and time match without need for operator intervention. Further, if the target transport container, such as a cart, already contains one or more portions of another load at the time of collection, the load quality information for all of the contained, partially filled loads can be aggregated together as appropriate for the circumstances.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for automatically refueling a vehicle using fuel storage modules, comprising:
    a vehicle comprising a fuel manifold that couples with a plurality of fuel modules and controls fuel flow from the fuel modules to provide fuel to the vehicle, the fuel modules storing fuel for the vehicle;
    a remote fuel storage apparatus, disposed proximate to a target operation performed by the vehicle, the remote fuel storage apparatus comprising:
        a plurality of storage bays that respectively hold a fuel module, and at least one empty bay to receive a fuel module from the vehicle; and
        a storage control module that determines a location of the at least one empty bay for receiving a fuel module from the vehicle, and a location of a storage bay with a non-empty fuel module for transfer to the vehicle;
    one or more actuators that move fuel modules between storage bays in the remote fuel storage apparatus, and that move modules between the vehicle and the remote fuel storage apparatus; and
    a controller comprising memory configured to store instructions and data, and a processor to process the data and instructions, the controller identifying a fuel loading operation that comprises transiting the vehicle to the remote fuel storage apparatus to exchange modules between the vehicle and the remote fuel storage apparatus.

2. The system of claim 1, comprising one or more fuel module couplings engaged with the fuel manifold, wherein the fuel module couplings respectively couple with a fuel module to provide fuel to the fuel manifold.

3. The system of claim 2, comprising a sensor array, the sensor array comprising an alignment sensor that detects alignment between the fuel module and the one or more fuel module couplings.

4. The system of claim 3, the alignment sensor comprising one of: an image sensor, sonar sensor, radar sensor, magnetic sensor, and electrical signal sensor.

5. The system of claim 1, comprising a sensor array comprising one or more sensors, that detect one or more of: fuel pressure, fuel flow, fuel amount, fuel leakage, and module connection with coupling.

6. The system of claim 5, the controller comprising a module coupling control that operably controls coupling and decoupling of a fuel module with a fuel module coupling engaged with the fuel manifold, the module coupling control communicatively coupled with the sensor array that comprises a sensor that detects whether the fuel module is appropriately coupled with the fuel module coupling.

7. The system of claim 6, the module coupling control using the sensor array to determine that appropriate fueling conditions are present comprising pre-determined fuel line pressure, a location of the module, a condition of the module, leak detection, and/or pre-determined alignment procedures.

8. The system of claim 1, the respective fuel modules configured to store one of:
    electrical power;
    hydrogen fuel;
    low or no carbon fuels; and
    hydrocarbon-based fuel.

9. The system of claim 1, the controller identifying the fuel loading operation comprising using data indicative of one or more of the following to determine whether the vehicle performs the fuel loading operation:
    a distance between the vehicle and the remote fuel storage apparatus;
    an amount of fuel remaining in the fuel module(s);
    the target operation performed the vehicle; and
    a usage rate of fuel by the vehicle.

10. The system of claim 9, the controller identifying the fuel loading operation based at least on one of:
    a fuel level threshold being met, the fuel level threshold indicative of an amount of fuel needed to at least transit to the remote fuel storage apparatus;
    a proximity threshold being met indicative of a proximity to the remote fuel storage apparatus; and
    an operation threshold being met indicative of an amount of fuel needed to complete the target operation.

11. The system of claim 1, the storage control module controlling one or more of the one or more actuators that move fuel modules between the storage bays of the remote fuel storage apparatus to provide the at least one empty bay, and to provide the storage bay with a non-empty fuel module.

12. The system of claim 1, the vehicle comprising a vehicle side modular fueling station that operably holds the one or more fuel modules, and the sensor array comprising a fuel module alignment sensor that detects when the vehicle side modular fueling station is appropriately aligned with the remote fuel storage apparatus for exchanging of fuel modules between the vehicle side modular fueling station and the remote fuel storage apparatus.

13. A system for automatically refueling a vehicle using fuel storage modules, comprising:
  a vehicle that utilizes fuel storage modules to provide fuel for the vehicle during a target operation, the vehicle comprising:
    a fuel manifold that provides fuel to the vehicle, the fuel manifold comprising a plurality of fuel module couplings engaged with the fuel manifold, wherein the fuel module couplings are respectively configured to couple with a fuel module;
    a vehicle side modular fueling station that operably holds one or more fuel modules that are respectively coupled to a fuel module coupling, wherein the one or more fuel modules store fuel for the vehicle;
    a controller comprising memory configured to store instructions and data, and a processor to process the data and instructions, the controller identifying a fuel loading operation that, when triggered, comprises transiting the vehicle to a remote fuel storage apparatus to exchange modules between the vehicle and the remote fuel storage apparatus; and
    a sensor array comprising one or more sensors that detect fuel characteristics to identify an amount of fuel remaining in the module, and a fuel usage rate; and that detect an alignment of the vehicle side modular fueling station with the remote fuel storage apparatus during the fuel loading operation;
  wherein the fuel loading operation can be identified by data indicative of an amount of fuel remaining in the one or more fuel modules and data indicative of the target operation; and
  wherein the vehicle utilizes one or more actuators to automatically exchange fuel modules between the remote fuel storage apparatus and the vehicle side modular fueling station.

14. The system of claim 13, wherein the remote fuel storage apparatus is disposed proximate to the target operation performed by the vehicle, and the remote fuel storage apparatus comprises a plurality of storage bays that respectively hold a fuel module, and at least one empty bay to receive a fuel module from the vehicle during the fuel loading operation.

15. The system of claim 13, the sensor array comprising one or more sensors that detect one or more of:
  an alignment between a fuel module and one or the one or more fuel module couplings during the fuel loading operation; and
  fuel pressure, fuel flow, fuel amount, fuel leakage, and/or fuel module connection.

16. The system of claim 13, the controller comprising a module coupling control that operably controls coupling and decoupling of a fuel module with a fuel module coupling engaged with the fuel manifold, the module coupling control communicatively coupled with the sensor array that comprises a sensor that detects whether the fuel module is appropriately coupled with the fuel module coupling.

17. The system of claim 13, the respective fuel modules configured to store one of:
  electrical power;
  hydrogen fuel;
  low or no carbon fuels; and
  hydrocarbon-based fuel.

18. The system of claim 13, the controller identifying the fuel loading operation comprising using data indicative of one or more of the following to determine whether the vehicle performs the fuel loading operation:
  a distance between the vehicle and the remote fuel storage apparatus to determine if a proximity threshold is met indicative of a proximity to the remote fuel storage apparatus;
  an amount of fuel remaining in the fuel module(s), to determine if a fuel level threshold is met, the fuel level threshold indicative of an amount of fuel needed to at least transit to the remote fuel storage apparatus; and
  the target operation performed the vehicle, indicative of whether an operation threshold is met, indicative of an amount of fuel needed to complete the target operation.

19. A method for automatically refueling a vehicle using fuel storage modules, comprising:
  triggering a fuel loading event for a vehicle that utilizes fuel storage modules to provide fuel for the vehicle during a target operation, the vehicle comprising:
    a fuel manifold that provides fuel to the vehicle, the fuel manifold comprising a plurality of fuel module couplings engaged with the fuel manifold, wherein the fuel module couplings are respectively configured to couple with a fuel module;
    a vehicle side modular fueling station that operably holds one or more fuel modules that are respectively coupled to a fuel module coupling, wherein the one or more fuel modules store fuel for the vehicle;
    a controller comprising memory configured to store instructions and data, and a processor to process the data and instructions, the controller identifying a fuel loading operation that, when triggered, comprises transiting the vehicle to a remote fuel storage apparatus to exchange modules between the vehicle and the remote fuel storage apparatus; and
    a sensor array comprising one or more sensors that detect fuel characteristics to identify an amount of fuel remaining in the module, and a fuel usage rate; and that detect an alignment of the vehicle side modular fueling station with the remote fuel storage apparatus during the fuel loading operation;
    wherein the triggering of the fuel loading operation can be identified by data indicative of an amount of fuel remaining in the one or more fuel modules and data indicative of the target operation;
  aligning the vehicle side modular fueling station with the remote fuel storage apparatus, wherein the remote fuel storage apparatus is disposed proximate to the target operation performed by the vehicle, the remote fuel storage apparatus comprising a plurality of storage bays that respectively hold a fuel module, and at least one empty bay to receive a fuel module from the vehicle; and
  using one or more actuators to automatically exchange fuel modules between the remote fuel storage apparatus and the vehicle side modular fueling station during the fuel loading event.

* * * * *